Patented Dec. 30, 1947

2,433,517

UNITED STATES PATENT OFFICE 2,433,517

FINISH REMOVER COMPOSITION

Lester E. Kuentzel, Wyandotte, Mich., assignor to Wyandotte Chemicals Corporation, Wyandotte, Mich., a corporation of Michigan No Drawing. Application November 5, 1943, Serial No. 509,121

3 Claims. (Cl. 252—154)

This invention relates to compositions for removing finishes such as paints, varnishes, enamels and primers.

This invention has for an object to provide compositions for stripping surface coatings from metal, wood or composition bases. A further object is to provide a finish remover for painted or otherwise coated surfaces which display pronounced resistance toward removers. It is an added object to provide a finish remover where stripping in tanks is not adaptable or ineffective, or where the stripping cannot be accomplished by alkaline products without danger of corrosion. It is a particular object of this invention to provide an effective aircraft engine cowling finish remover, because this object presents an especially difficult stripping job due to the baking effects of high temperature over long periods.

It has been proposed to employ finish removers comprising carbon tetrachloride, chlorinated acetylene, trichlorethylene and other chlorinated solvents admixed with such liquids as wood alcohol, allyl alcohol or various ketones, and to which suitable thickeners and waxy evaporation retarders, as well as anti-acid materials have been added. The amount of amines in such compositions to correct acidity is in the range of about 1% or even less. Applicant has found that when an amine is added in such amounts to chlorinated hydrocarbon solvents that the chlorinated solvents do not readily strike through the finish and primer coatings; they are scarcely more effective than the liquid chlorinated solvents per se.

Applicant has found after studying and testing several thousand formulations that if a chlorinated hydrocarbon is mixed with at least 5% of an organic amine and much preferably at least 20%, a finish remover is secured which is capable of rapidly removing the most difficult finishes. This holds true whether the finish is a zinc chromate primer, cellulose acetate lacquer, varnish or enamel having urea-formaldehyde resins, phenol resins or glycerol phthalate resins therein, and whether baked or air dried. While various combinations of organic amines and chlorinated hydrocarbon solvents above this minimum will remove finishes, not all are equally efficient. Furthermore, stripping paint from a commercial aspect is not alone a matter of mixing these components together to secure a composition possessing the inherent property of attacking a paint film.

An ideal paint stripper should be non-corrosive, non-inflammable, slow to evaporate, viscous enough to prevent draining, fluid at low temperature, water dispersible, completely stable, non-toxic, reasonably inexpensive and easy to compound. In addition of paramount importance is that it should remove the finish quickly, and should leave the surface in condition for refinishing directly. At present, due to the war, it should be made from non-critical materials.

Applicant has found that whereas these aforesaid two groups of organic compounds in the ratios indicated have the ability to remove paint better than the chlorinated hydrocarbon, the presence of both methyl cellulose as a thickener and water is desirable. The methyl cellulose is a water dispersible thickener. Bentonite is a suitable thickener under some conditions. Methylene chloride is the preferred chlorinated hydrocarbon; and cyclohexylamine and butyl amine are the preferred organic amines. It is frequently desirable to have a small amount of ethyl silicate or water glass present to prevent corrosion of metal surfaces, should the applied remover be left on metals inadvertently too long a period before washing off. The presence of paraffin therein is desirable since it deters evaporation of the volatile components. An added dye not only aids in securing an even application, but assists visual observations of the wrinkling or softening of the finish. A wetting agent such as an alkylated aromatic sulfonate or its alkali salt is helpful in blending higher proportions of water than otherwise tolerated, thereby reducing inflammability, volatility, toxicity and costs.

Some of the amines which can be employed in combination with methylene chloride to secure a composition which strips finishes well are: ethyl amine, ethylene diamine, diethyl amine, n-propyl amine, isopropyl amine, n-iso butyl amine, cyclohexylamine, octylamine, dioctyl amine, 2-aminobutanol, ethanol amine, aminoethylethanol amine, ethyl diethanolamine, ethyl dimethanolamine, ethyl monoethanolamine, butyl diethanolamine, butyl monoethanolamine, diethanolaminoethanol, triethanolamine and morpholine.

The aforesaid amines can be used in combination with ethylene dichloride as well as other chlorinated hydrocarbons.

Preferred embodiments of applicant's invention are set out in the following examples:

EXAMPLE I

Formulation No. 529

| Constituent | Unit Quantities | Weight | Percentage by Weight |
|---|---|---|---|
| | | Grams | |
| Methylene Chloride | 100 ml | 133.6 | 64.04 |
| Paraffin | 1 g | 1.0 | 0.48 |
| Methyl Cellulose | 2 g | 2.0 | 0.96 |
| Cyclohexylamine | 70 ml | 60.55 | 29.02 |
| Water Glass | 1 ml | 1.41 | 0.68 |
| Water | 10 ml | 10.00 | 4.79 |
| Patent Blue Dye | 0.06 g | 0.06 | 0.03 |
| | | 208.62 | 100.00 |

EXAMPLE II

Formulation No. 530

| Constituent | Unit Quantities | Weight | Percentage by Weight |
|---|---|---|---|
| | | Grams | |
| Methylene Chloride | 100 ml | 133.6 | 66.8 |
| Paraffin | 1 g | 1.0 | 0.51 |
| Methyl Cellulose | 2 g | 2.0 | 1.01 |
| n-Butyl Amine | 70 ml | 51.73 | 25.84 |
| Water Glass | 1 ml | 1.41 | 0.71 |
| Water | 10 ml | 10.00 | 5.1 |
| Patent Blue Dye | 0.06 g | 0.06 | 0.03 |
| | | 199.80 | 100.00 |

EXAMPLE III

Formulation No. 510

| Constituent | Unit Quantities | Weight | Percentage by Weight |
|---|---|---|---|
| | | Grams | |
| Ethylene Dichloride | 100 ml | 133.6 | 69.0 |
| Paraffin | 1 g | 1.0 | 0.5 |
| Cellulose Acetate | 5 g | 5.0 | 2.6 |
| n-Butyl Amine | 70 ml | 51.7 | 26.5 |
| Water Glass | 2 ml | 2.8 | 1.4 |
| | | 194.1 | 100.0 |

EXAMPLE IV

Formulation No. 440

| Constituent | Unit Quantities | Weight | Percentage by Weight |
|---|---|---|---|
| | | Grams | |
| Methylene Chloride | 100 ml | 133.6 | 62.0 |
| Paraffin | 1 g | 1.0 | 0.45 |
| Methyl Cellulose | 2 g | 2.0 | 0.9 |
| n-Butyl Amine | 100 ml | 73.9 | 34.0 |
| Ethyl Silicate | 1 ml | 0.93 | .35 |
| Wetsit¹ Conc | 5 ml | 5.0 | 2.3 |
| | | 216.43 | 100.00 |

EXAMPLE V

Formulation No. 330

| Constituent | Unit Quantities | Weight | Percentage by Weight |
|---|---|---|---|
| | | Grams | |
| Methylene Chloride | 50 ml | 66.8 | 57.0 |
| Isopropyl Amine | 50 ml | 34.7 | 29.5 |
| Methyl Cellulose | 5 g | 5.0 | 4.2 |
| Paraffin | 1 g | 1.0 | 0.8 |
| Bentonite | 10 g | 10.0 | 8.5 |
| | | 117.5 | 100.0 |

EXAMPLE VI

Formulation No. 223

| Constituent | Unit Quantities | Weight | Percentage by Weight |
|---|---|---|---|
| | | Grams | |
| Ethylene Dichloride | 20 ml | 26.7 | 23.2 |
| Sec. Butyl Amine | 30 ml | 22.2 | 19.2 |
| Wetsit¹ Conc | 10 ml | 10.0 | 8.6 |
| Water | 50 ml | 50.0 | 43.4 |
| Bentonite | 5 g | 5.0 | 4.3 |
| Soap | 1.5 g | 1.5 | 1.3 |
| | | 115.4 | 100.0 |

¹ "Wetsit" is alkylated aromatic sodium sulfonate.

The following tables set out groupings or combinations of chlorinated hydrocarbons with organic amines that have demonstrated their ability to strip paints and other finishes. Each combination shows stripping efficiency greatly superior to a similar combination, but for the omission of the designated amine or its presence in a range of 1%. Parts are by weight (g.) for solid materials and by volume (ml.) for liquids, and in the tables are enclosed in parentheses, the word "parts" being omitted.

In Table I the methylene chloride is designated by the letter "A" for convenience and to consolidate the table crosswise. In Table II the ethylene dichloride is designated by the letter "B" for like reason; in Table III dichlorpentane by the letter "C" and in Table IV trichlorbenzene by the letter "D."

TABLE I

*Methylene chloride—Amine stripper*

1. A (5)+isobutyl amine (1)
2. A (5)+sec. butyl amine (1)
3. A (2)+sec. butyl amine (3)+water (5)
4. A (1)+sec. butyl amine (3)+water (4)+starch (1)
5. A (1)+sec. butyl amine (3)+water (4)+bentonite (1)
6. A (1)+sec. butyl amine (0.5)+monoisobutyl amine (0.5)+water (4)+bentonite (1)
7. A (2)+sec. butyl amine (3)+water (4)+bentonite (0.5)+starch (0.5)
8. A (1)+ethyl amine (1)
9. A (1)+morpholine (1)
10. A (1)+cyclohexylamine (1)
11. A (1)+ethyl amine (2)+"Tergitol"¹ (2)+bentonite (1)+water (4)
12. A (1)+sec. butyl amine (2)+"Tergitol" (2)+bentonite (1)+water (4)+starch (0.5)
13. A (1)+sec. butyl amine (2)+"Tergitol" (2)+bentonite (1)+water (4)
14. A (1)+monoisobutyl amine (1)+diethyl acetamide (1)+"Tergitol" (1)
15. A (2)+sec. butyl amine (2)+"Aerosol"² (1)+bentonite (0.5)+water (5)
16. A (2)+sec. butyl amine (2)+"Aerosol"² (1)+bentonite (0.5)+water (5)+water glass (0.004)
17. A (2)+sec. butyl amine (2)+"Aerosol"² (1)+bentonite (0.5)+water (5)+ethyl silicate (0.0008)
18. A (2)+monoisobutyl amine (2)+"Aerosol"² (1)+bentonite (1)+water (10)+ethyl silicate (0.05)
19. A (4)+isopropyl amine (4)+"Aerosol"² (2)+bentonite (1)+water (10.5)+ethyl silicate (0.1)+an alkyl aryl sodium sulfonate (0.5)
20. A (2)+isopropyl amine (2)+bentonite (0.5)+water (6)+ethyl silicate (0.1)+an alkyl aryl sodium sulfonate (1)

TABLE II

*Ethylene dichloride—Amine stripper*

1. B (5)+monoisobutyl amine (1)
2. B (1)+n-propyl amine (1)
3. B (3)+n-propyl amine (3)+diethyl amine (3)+ alcohol (1)
4. B (4.5)+diethyl amine (4.5)+alcohol (1)
5. B (10)+allyl amine (90)
   (10)+amyl amine (90)
6. B (10)+amyl mono. sec. amine (90)
7. B (10)+diethylene tetramine (90)
8. B (10)+ethyl amine (90)
9. B (10)+piperidine (90)
10. B (10)+triethylene tetramine (90)
11. B (10)+trimethyl amine (90)
12. B (2)+sec. butyl amine (3)+water (5)+methyl ethyl ketone (1)+bentonite (0.5)+soap (0.15)

TABLE III

*Dichloropentane—Amine stripper*

1. C (2)+sec. butylamine (2)+cyclohexylamine (2) +water (5)+methyl ethyl ketone (1)+ bentonite (0.5)+soap (0.15)
2. C (1)+sec. butyl amine (1)+"Tergitol" (1)
3. C (1)+ethylene chlorhydrin (1)+monoisobutyl amine (1)+"Tergitol" (1)

TABLE IV

*Trichlorbenzene—Amine stripper*

1. D (2)+n-butyl amine (2)+sec. butyl amine (3) +methyl ethyl ketone (2) water (5+ bentonite (0.5)+soap (0.15)

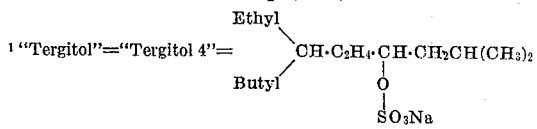

¹ "Tergitol"="Tergitol 4"=

² "Aerosol"="Aerosol AS"=Isopropyl naphthalene sodium sulfonate.

TESTS

The paint stripping ability has been tested on a variety of paints, lacquers and enamels.

The tests were carried out as follows: Aluminum alloy panels 3″ x 6″ having smooth edges were selected. The panels were anodized then finished as indicated in Table V (same as set forth in Navy Aeronautical Specification C–113, Amendment 2, of September 7, 1942). The panels were allowed to air dry two weeks or more before stripping.

primed panel. The four panels were allowed to air dry for approximately one hour and baked four days at a temperature of approximately 100° C.

A heavy uniform coating of the removal compound was applied by spraying or brushing to one of the lacquered panels and to one of the enameled panels. When loosening of the finish was approximately complete, a stream of water was run over each panel, and the panel scrubbed with a brush at the same time.

After the finish remover had been applied to the surfaces most paints began to wrinkle loose within 1 to 5 minutes. Once the wrinkling action stopped, it was possible to see any spots that had been missed and touch-up work at this stage was advantageous. For the more efficient formulations second and third applications as permitted by Specification C–113 were not needed.

Applicant's finish removers can be applied on a commercial scale to the coated surface to be stripped in a variety of ways such as by a cotton swab, mop, brush, coarse sponge or a spray gun, whichever is most suitable. They flow when applied to an object, then quickly gel or set. Disassembled parts can be dipped therein, but it is preferred to remove the articles promptly to await the stripping action. The coated surface after the application is allowed to stand at least two minutes, then brushed as with a bristle brush and the paint then flushed off with water. Coatings very resistant toward removal require additional time. Once the paint becomes completely loosened, it is advisable to remove it as soon as convenient. Caution should be observed that a period of 30 minutes to an hour between the loosening of the paint and its removal is not exceeded, because final removal then becomes more difficult.

The visual test of formation of wrinkles or blisters is a good gauge in ascertaining whether the coating has been loosened from the base. Any spots missed in the first operation are touched up in a similar manner. The surface is ready for refinishing as soon as dry. It is not necessary, or extremely seldom, to rub down with a paint thinner. Steel frames of airplanes stripped in the above manner stood out of doors in very damp weather after finish stripping for four days without rust formation.

TABLE V

*Stripping test panels finishes*

| Panel | Priming coat | | Product (2 coats) | | | Bake After Final Coat |
|---|---|---|---|---|---|---|
| | Material | Drying Time Before Next Coat | Material | Drying Time Between Coats | Drying Time Before Baking | |
| | | Hours | | Hours | Hours | |
| 70E | Zinc Chromate, AN-TT-P-656 | 1 | Varnish, Aluminized, AN-TT-V-118. | 6 | 18 | 4 hrs. at 175° F. |
| 72 | Zinc Chromate, AN-TT-P-656 | 1 | Lacquer, High Resin Phthalate, AN-TT-L-51 Aluminized. | 6 | | |
| 75E | Zinc Chromate, AN-TT-P-656 | 1 | Enamel Glyceryl Phthalate Gray, E-5. | 6 | 18 | 4 hrs. at 175° F. |

Tests were also made according to Army Air Forces Specification No. 14119 of November 24, 1942. A coat of zinc chromate primer was sprayed on each of two test panels and air dried for approximately one hour. One coat of camouflage lacquer in accordance with Army Air Forces Specification No. 14105 was sprayed on one of the panels and one coat of camouflage enamel in accordance with No. 14109 on the other Badly carbonized pistons from high test gasoline aviation engine motors were cleaned by immersion in the formulation of Example II at room temperature. After removal from the cleaning liquid, the piston was brushed with a bristle brush and flushed off with cold water while being brushed. Compressed air was used to blow off the water and dry the piston. Complete removal of deposits in recesses such as in ring grooves was secured in this manner by exposure to the stripper overnight, a difficult accomplishment.

The above description, examples and formulations are to be construed as illustrative only and not as limiting the scope of the invention. Any modification or variation therefrom which conforms to the invention as set out in the claims is intended to be included within the scope. Applicant does not intend to be bound by any theory, although it appears the amine (in the proportions employed) strikes through the surface finish readily and permits the chlorinated solvent to penetrate and exert a softening and lifting effect.

I claim:

1. A composition for removing paint, varnish, enamel and the like, comprising methylene chloride and 0.7 part to equal parts by volume of cyclohexylamine for each part of methylene chloride present.

2. A composition for removing paint, varnish, enamel and the like, comprising methylene chloride as the major ingredient, cyclohexylamine, water and methyl cellulose, said cyclohexylamine being present in the amount of 5% to 29% by weight of the total composition, said water and said methyl cellulose each being present in amounts less than that of the ohter named ingredients.

3. A composition for removing paint, varnish, enamel and the like, comprising by weight, approximately 64% methylene chloride, approximately 29% cyclohexylamine, and the balance methyl cellulose, water, and a wax.

LESTER E. KUENTZEL.

REFERENCES CITED

The following references are of record in the file of this patent:

UNITED STATES PATENTS

| Number | Name | Date |
|---|---|---|
| 1,993,096 | Hodges | Mar. 5, 1935 |
| 2,388,082 | Roediger | Oct. 30, 1945 |
| 2,356,747 | Bowman et al. | Aug. 29, 1944 |
| 1,000,162 | Ellis | Aug. 8, 1911 |
| 2,145,827 | Chester | Jan. 31, 1939 |
| 1,189,803 | Ellis | June 4, 1916 |
| 1,855,872 | Shaw | Apr. 26, 1932 |

FOREIGN PATENTS

| Number | Country | Date |
|---|---|---|
| 215,880 | Great Britain | Nov. 14, 1922 |
| 446,147 | Great Britain | Apr. 24, 1936 |
| 485,857 | Great Britain | May 20, 1938 |

OTHER REFERENCES

Page 35 of "Synthetic Organic Chemicals," by Carbide and Carbon Chemicals Corp., Oct. 15, 1940.